(12) United States Patent
Ma et al.

(10) Patent No.: US 8,340,677 B2
(45) Date of Patent: Dec. 25, 2012

(54) SYSTEM AND METHOD FOR SEMI-STATIC DOWNLINK INTER-CELL INTERFERENCE COORDINATION FOR WIRELESS COMMUNICATIONS

(75) Inventors: Jianglei Ma, Ottawa (CA); Mohammadhadi Baligh, Kanata (CA); Aaron Callard, Ottawa (CA)

(73) Assignee: Futurewei Technologies, Inc., Plano, TX (US)

( * ) Notice: Subject to any disclaimer, the term of this patent is extended or adjusted under 35 U.S.C. 154(b) by 149 days.

(21) Appl. No.: 12/827,177

(22) Filed: Jun. 30, 2010

(65) Prior Publication Data

US 2011/0003598 A1   Jan. 6, 2011

Related U.S. Application Data

(60) Provisional application No. 61/222,865, filed on Jul. 2, 2009.

(51) Int. Cl.
*H04W 72/00* (2009.01)
(52) U.S. Cl. ........................ 455/452.1; 455/522; 455/450
(58) Field of Classification Search ................ 455/452.1, 455/522, 450
See application file for complete search history.

(56) References Cited

U.S. PATENT DOCUMENTS

| | | | |
|---|---|---|---|
| 2008/0239989 A1* | 10/2008 | Dekorsy | 370/254 |
| 2009/0291692 A1* | 11/2009 | Kazmi et al. | 455/452.2 |
| 2010/0208610 A1* | 8/2010 | Ihm et al. | 370/252 |
| 2010/0248728 A1* | 9/2010 | Sun et al. | 455/450 |
| 2011/0070911 A1* | 3/2011 | Zhang et al. | 455/509 |
| 2011/0098054 A1* | 4/2011 | Gorokhov et al. | 455/452.1 |
| 2011/0319126 A1* | 12/2011 | Chang et al. | 455/522 |
| 2012/0058789 A1* | 3/2012 | Miao et al. | 455/501 |

OTHER PUBLICATIONS

Stolyar, A.L., et al., "Self-organizing Dynamic Fractional Frequency Reuse in OFDMA Systems," Jun. 18, 2007, pp. 1-25, Bell Labs.

* cited by examiner

*Primary Examiner* — Barry Taylor
(74) *Attorney, Agent, or Firm* — Slater & Matsil, L.L.P.

(57) ABSTRACT

In accordance with an embodiment, a method of operating a base station in a wireless system, includes partitioning a frequency band into at least one band of a first type and at least one band of a second type, and coordinating the partitioning with at least one further base station. The at least one band of the first type includes a band on which the base station transmits power proportional to a distance of a user device from the base station, and the at least one band of the second type comprises a band on which base station transmits a data rate inversely proportional to a distance of a user device from the base station.

24 Claims, 7 Drawing Sheets

SYSTEM AND METHOD FOR SEMI-STATIC DOWNLINK INTER-CELL INTERFERENCE COORDINATION FOR WIRELESS COMMUNICATIONS

CROSS REFERENCE TO RELATED APPLICATIONS

This patent application claims priority to U.S. Provisional Application No. 61/222,865 filed on Jul. 2, 2009, entitled "Semi-Static Downlink Inter Cell Interference Coordination for Wireless Communications," which application is hereby incorporated by reference herein.

TECHNICAL FIELD

The present invention relates generally to wireless communications, and more particularly to a system and method for semi-static downlink inter-cell interference coordination for wireless communications systems.

BACKGROUND

Wireless communication systems are widely used to provide voice and data services for multiple users using a variety of access terminals such as cellular telephones, laptop computers and various multimedia devices. Such communications systems can encompass local area networks, such as IEEE 801.11 networks, cellular telephone and/or mobile broadband networks. The communication system can use a one or more multiple access techniques, such as Frequency Division Multiple Access (FDMA), Time Division Multiple Access (TDMA), Code Division Multiple Access (CDMA), Orthogonal Frequency Division Multiple Access (OFDMA), Single Carrier Frequency Division Multiple Access (SC-FDMA) and others. Mobile broadband networks can conform to a number of system types or partnerships such as, General Packet Radio Service (GPRS), 3rd-Generation standards (3G), Worldwide Interoperability for Microwave Access (WiMAX), Universal Mobile Telecommunications System (UMTS), the 3rd Generation Partnership Project (3GPP), Evolution-Data Optimized EV-DO, or Long Term Evolution (LTE).

In communication systems where several users share the same transmission medium, the possibility exists for different transmitters of a shared communication resource to interfere with each other. In cellular communication systems, where geographical division is used to separate users, the inter-cell interference is interference between transmitters in adjacent or neighboring cells.

OFDMA systems, such as LTE, can be deployed as frequency reuse-1 systems, in which all cells transmit over the same frequency spectrum. While such systems are spectrally efficient, the performance of user devices on the edge of a cell may suffer because of inter-cell interference from adjacent cells. The effect of inter-cell interference is especially acute in systems with small cells.

SUMMARY OF THE INVENTION

In accordance with an embodiment, a method of operating a base station in a wireless system, includes partitioning a frequency band into at least one band of a first type and at least one band of a second type, and coordinating the partitioning with at least one further base station. The at least one band of the first type includes a band on which the base station transmits power proportional to a distance of a user device from the base station, and the at least one band of the second type comprises a band on which the base station transmits a data rate inversely proportional to a distance of a user device from the base station.

In accordance with a further embodiment, a method of operating a base station configured to communicate with user devices includes receiving signal information from the user devices, where the signal information includes information about signals received by the user devices. The method further includes classifying the user devices as cell edge users (CEUs) or cell center users (CCUs) based on the signal information, scheduling the CEUs to high power resource blocks of fractional frequency reuse (FFR) bands within a frequency band, and scheduling the CCUs in non-fractional frequency reuse (non-FFR) bands of the frequency band.

In accordance with a further embodiment, a method of communicating in a wireless system includes configuring a cell in a network with an initial configuration of fractional frequency reuse (FFR) bands and non-fractional frequency reuse (non-FFR) bands. The initial configuration assigns a power setting to a low power setting and a high power setting of the FFR bands. The method also includes changing the power setting of the FFR bands in the cell to a changed power setting, informing a user device of the changed power setting, informing neighboring cells of the changed power setting, and changing a bandwidth partition between non-FFR bands and FFR bands after changing the power setting of the FFR bands.

In accordance with a further embodiment, a base station includes a transmitter, a communications interface configured to interface with at least one further base station, and a processor partitioning a frequency band into at least one band of a first type and at least one band of a second type. The at least one band of the first type includes a band on which the base station transmits on the transmitter a power proportional to a distance of a user device from the base station, and the at least one band of the second type includes a band on which base station transmits on the transmitter a data rate inversely proportional to a distance of a user device from the base station. The base station coordinates the partitioning with the at least one further base station via the communications interface The foregoing has outlined rather broadly the features of some embodiments of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to various embodiments in a specific context, a system and method for semi-static downlink inter-cell interference coordination for wireless communications. Embodiments of the invention may also be applied to other types of communications systems and networks.

Figure 1A:
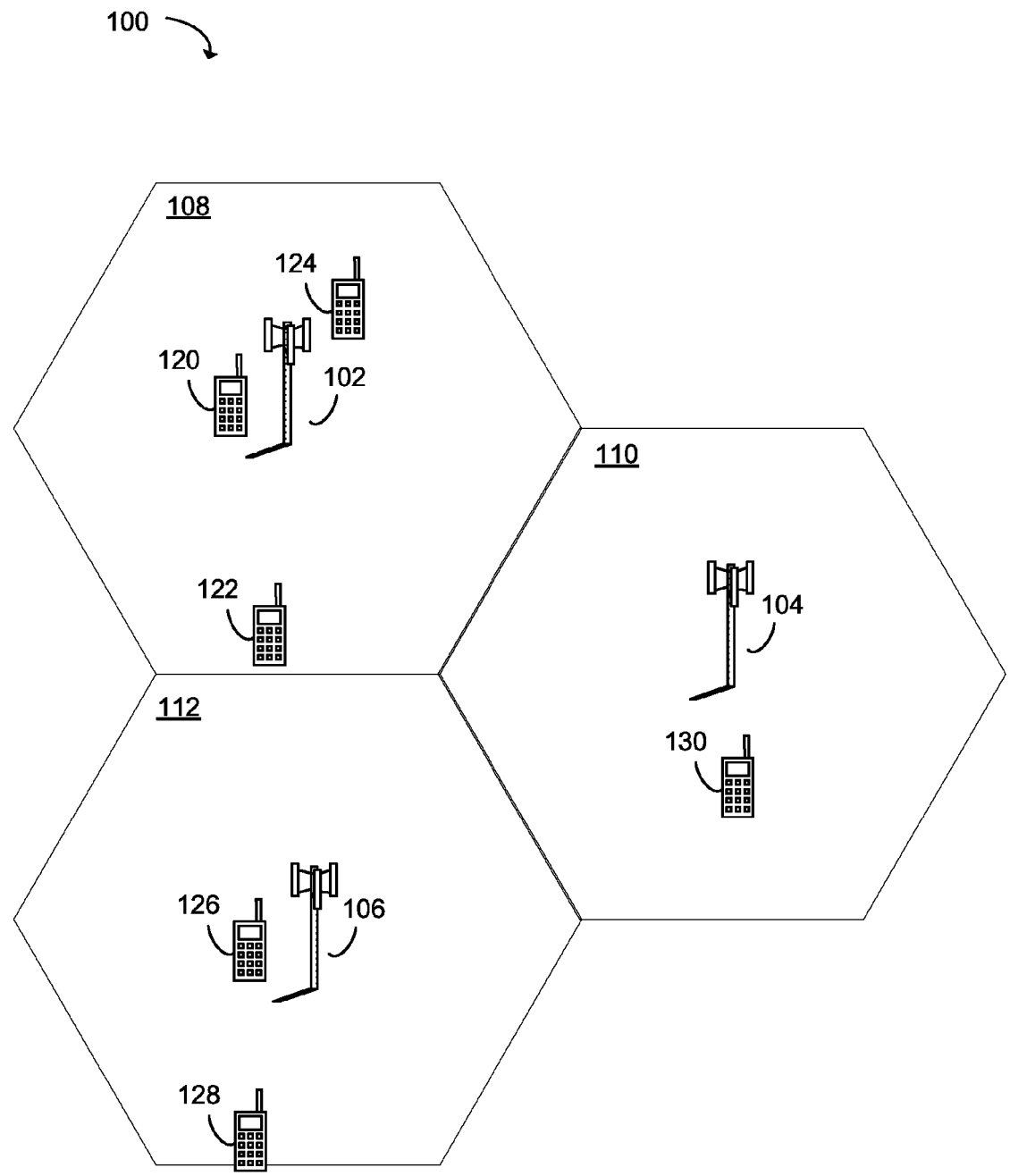
FIGS. 1a-c illustrate embodiment cellular systems and frequency plans.

FIG. 1a illustrates an embodiment cellular system with three cells, 108, 110 and 112, each having base stations 102, 104 and 106, respectively. Cell 108 serves user devices 120, 122 and 124, cell 110 serves user device 130 and cell 112 serves user devices 126 and 128. In an embodiment, user devices 120 and 124 are considered cell center users (CCU) because of their close proximity to base station 102, and user device 122 is considered a cell edge user (CEU) because of it proximity to the edge of cell 108. In some embodiments, the determination of whether a user device is a CCU or a CEU can be made geographically. Alternatively, the determination can be made electrically, for example, in terms of signal attenuation. While three cells serving a total of six user devices are illustrated for simplicity of illustration, greater or fewer cells and user devices can be used in embodiments of the present invention.

In embodiments, inter-cell interference is addressed by employing fractional frequency reuse (FFR) inter-cell interference coordination (ICIC) techniques. When FFR is used, a base station, such as a LTE enhanced Node B (eNB) uses more transmission power to communicate with a distant user than it does to communicate with a user closer to the base station.

Embodiment systems employ a variety of different FFR modes: non-FFR, hard FFR, and soft FFR, which can be further classified as static soft FFR and dynamic soft FFR. Non-FFR is frequency reuse-1, and Hard FFR is a true frequency reuse-3, which means that each cell only transmits in one-third of the FFR bandwidth, though a non-FFR region may still exist. In static soft FFR, a bandwidth partition between high power subchannels (band) and low power subchannels are fixed. A CEU is primarily scheduled in the high power zone and a CCU is primarily scheduled in low power zone. In dynamic soft FFR, the bandwidth partition between high power subchannel and low power subchannel can be changed dynamically.

In various embodiments, a semi-static coordinated DL-ICIC is applied with downlink (DL) power control. Embodiments include using a hybrid rate control, power control and coordinated cooperation between different cells to obtain cell edge performance. Adaptation between the different FFR operation modes, which include frequency reuse-1, frequency reuse-3, static FFR and dynamic FFR is performed through slow power control to optimize system performance with the change of a network operation environment.

An embodiment using a hybrid rate control and power control is first described. In an OFDM system, rate control is used to optimize system capacity and rate control is realized through link adaptation. However, power control is also needed in order to meet the cell edge coverage target. To optimize both the cell throughput and cell edge throughput, frequency reuse-1 and fractional frequency reuse are used simultaneously in the same network in various embodiments. Hence, the whole band is partitioned into non-FFR band and FFR bands.

Figure 1B:
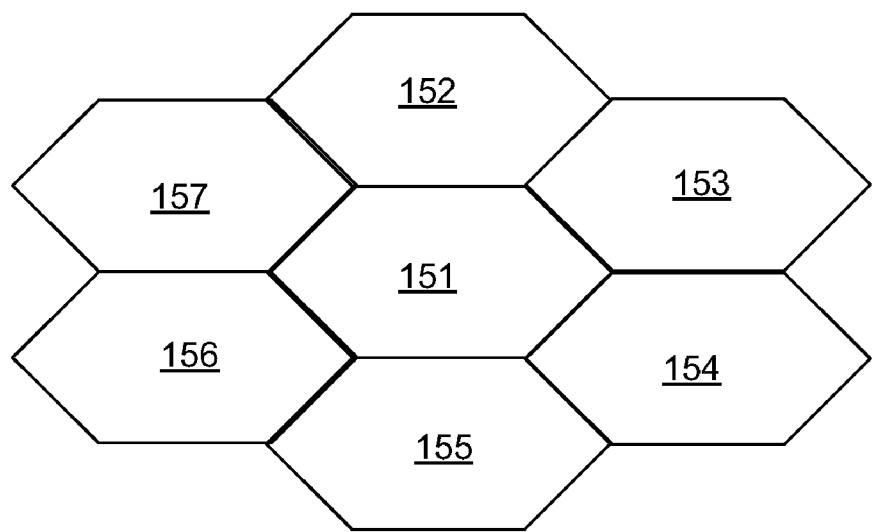
Figure 1C:
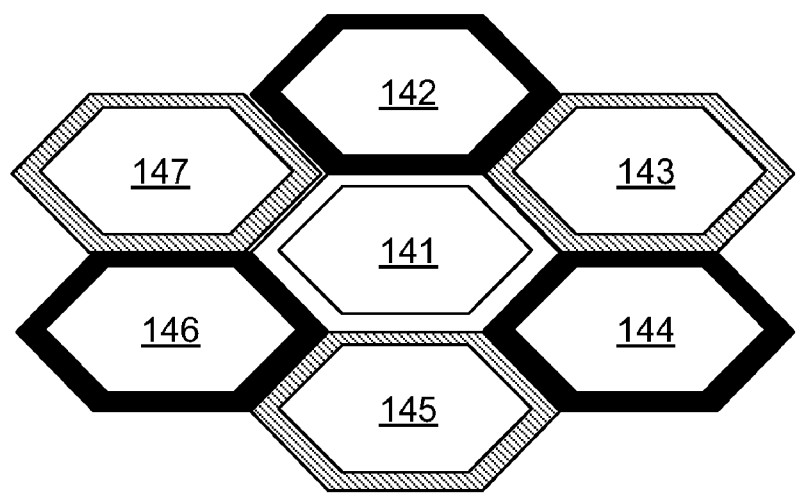

FIG. 1b illustrates a cell plan of non-FFR bands that use frequency reuse-1. Cells 151, 152, 153, 154, 155, 156 and 157 rely mainly on rate control and may use slow open loop (OL) power control to avoid transmitting with high power unnecessarily. In contrast, as illustrated in FIG. 1c, a FFR band may have a higher reuse. FIG. 1c illustrates a cell plan of FFR bands having a frequency reuse-3. Cell 141 uses a first frequency, cells 142, 144 and 146 use a second frequency, and cells 143, 145 and 147 use a third frequency.

In an embodiment, power is controlled to coordinately schedule cell center users (CCUs) and cell edge users (CEUs). The partition between non-FFR band and FFR band is updated semi-statically in various embodiments.

Figure 2:
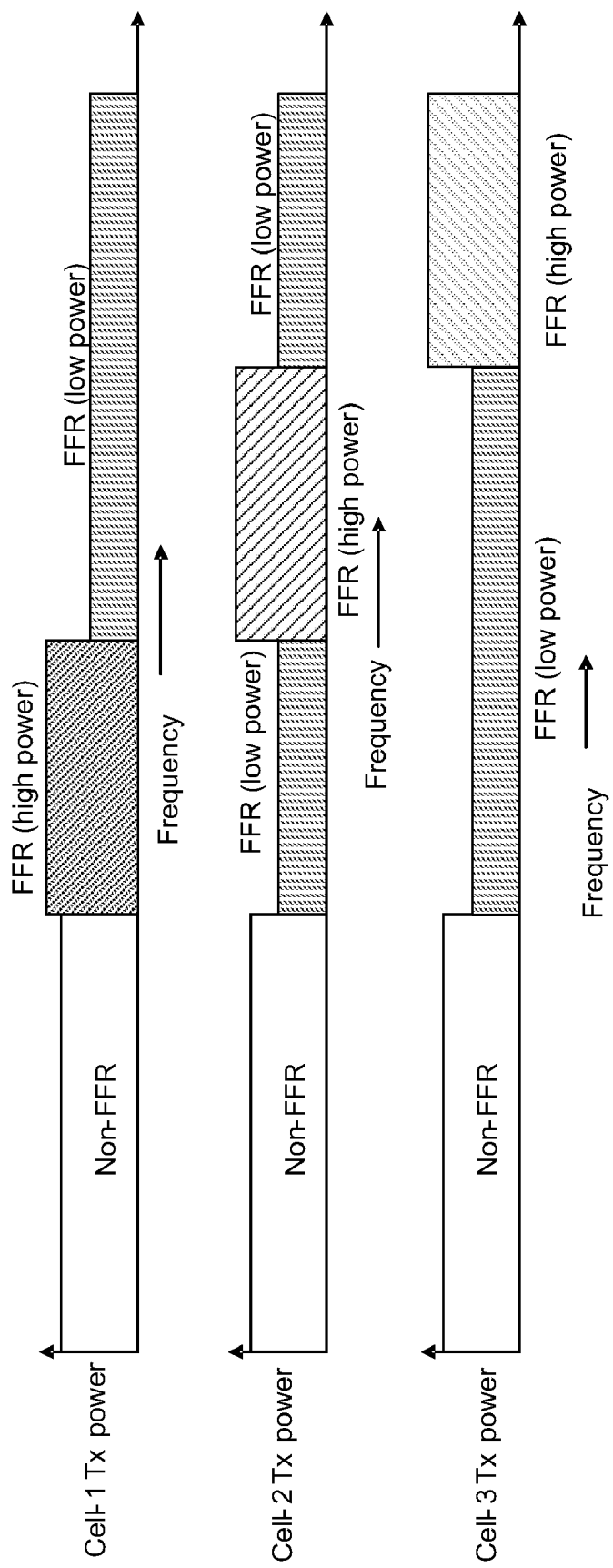
FIG. 2 illustrates an embodiment band allocation.

FIG. 2 illustrates embodiment band diagrams for three adjacent cells, or cells within the same area or network, having bandwidth assigned to non-FFR, FFR (high power) and FFR (low power) subbands. In an embodiment, the bandwidth partition is allocated to avoid collision between non-FFR bands and FFR bands, which makes interference level in non-FFR band more predictable. In a further embodiment, collision between FFR (high power) and FFR (low power) between certain groups of cells is prevented to improve cell edge performance. In an embodiment, resource block (RB) allocation considers the distributed virtual resource block (DVRB) structure and frequency selective scheduling (FSS) gain. In some embodiments, non-contiguous RB allocations crossing the whole band are considered.

In an embodiment, band partitioning for the cells are coordinated between the base stations of each cell. For example, in an embodiment, band partitioning is dynamically updated in a synchronous manner between all cells in a network, sub-network, or geographic area.

In embodiments, user equipment (UE) is classified as CCU or CEU based on reference signal received power (RSRP) reports or other mechanisms. In one embodiment with a predefined threshold, a UE only reports RSRP for a serving cell that is classified as a CCU. In a further embodiment, the UE that reports RSRP for both the serving cell and other cells can be classified as either CCU or CEU based on certain criteria. For example, based on the RSRP power or the relative power difference between serving cell RSRP and neighbor cell RSRP, the UE is classified as a CCU or a CEU.

In various embodiments, the CCU can be further separated into two categories: CCU-1, and CCU-2. CCU-1, includes, for example, a center user adjacent the eNB. In CCU-1, a UE has downlink (DL) power headroom that means that energy per resource element (EPRE) can be reduced. In one embodiment, a UE classified as a CCU-1 has a lower scheduling priority. CCU-2 refers to a UE that does not satisfy the requirements of CCU-1 and hence may include other cell center users.

In an embodiment, the UE is allocated to a particular band based on the above classifications. A UE is first classified as a CEU allocated in the high power RBs of an FFR band. A CEU that cannot be scheduled in the high power RBs is then scheduled in a non-FFR band. However, this does not prohibit scheduling CEU in a low power region under certain conditions.

In an embodiment, a UE classified as a CCU-1 is first allocated in FFR low power RBs if the cell is fully loaded. A CCU-1 that cannot be scheduled in lower power RBs can be scheduled in non-FFR band. On the other hand, a UE classified as a CCU-2 is first allocated in non-FFR band, and a CCU-2 that cannot be scheduled in non-FFR band is scheduled in lower power RBs of a FFR band. UEs classified as CCU-1 and CCU-2 can be allocated in unused high power RBs in FFR band.

In some embodiments, a UE that reports neighbor cell RSRP is classified as a CEU. Among the CEUs, a CEU that reports more neighbor cell RSRPs, i.e., with more neighbors on the neighbor list or report higher neighbor cell RSRP value or has a higher scheduling priority, is scheduled in a FFR (high power) band with a higher priority when not all CEUs can be scheduled in FFR (high power band). The remaining CEUs are scheduled in non-FFR bands.

A UE that does not report a neighbor cell RSRP is classified as a CEU in various embodiments. Such a CCU can be scheduled in all bands. If the channel resources of non-FFR and FFR (low power) bands are not enough for CCUs, some CCUs can be scheduled in a FFR (high power) band. Delay sensitive CCUs, however, are scheduled in a non-FFR band with a higher priority in some embodiments.

In various embodiments, ICIC parameters are configured semi-statically to optimize both the system capacity performance and the coverage performance. The semi-static configuration can be applied to (a) the bandwidth partition between FFR (low power), FFR (high power) and non-FFR bands, or (b) a relative power setting for FFR (low power) and FFR (high power) bands. In various embodiments, the adaptation is based, for example, on the changes of UE distribution, buffer status, UE traffic distribution, and the network loading.

In an embodiment, the bandwidth partition adaptation is done very slowly, for example, through eNB re-configuration. In one embodiment, the power setting adaptation is performed via modified X2 signaling (modified RNTP). In some embodiments, the power setting adaptation is slower and more coordinated from dynamic ICIC schemes. In one embodiment, bandwidth partition adaptation is performed after a power adjustment. In this embodiment, bandwidth partitions are updated when power control cannot help. Here, bandwidth partitioning is performed through network reconfiguration broadcasting messages.

In an embodiment, downlink ICIC adaptation is performed as follows. At the initial state, all cells in the network and/or geographical area configure the non-FFR band and FFR band according to an initial configuration defined by the network. This may be based on cell size and traffic load. In an embodiment, each cell has a certain percentage of bandwidth assigned for non-FFR. The same non-FFR and FFR bandwidth configuration across the certain area of the network may be used in the initial state.

In one embodiment, initial configuration of FFR band includes a frequency reuse-1 and hard frequency reuse-3. A low power setting is a predefined power level, for example, zero ($RNTP_{threshold}$=-inf) or the same power level as non-FFR may be used in some embodiments. Similarly, a predefined power level is assigned as the high power setting. For example, the high power setting may be the same as non-FFR (no additional power boost) in one embodiment. Alternatively, the high power setting may depend on the cell size.

After the initial state assignment, the state may be changed during normal operation. In various embodiments, power setting in a FFR band can be changed. For example, a base station or eNB communicates power change information to a UE through radio resource control (RRC) signaling (DL PC signaling). To reduce the RRC overhead, the power setting of a FFR (high power) band can be the same as that of a non-FFR band. The base station or eNB then informs its neighbors of the power setting change for FFR (low power) and for FFR (high power) through X2 signaling (Power threshold: $PNTP_{threshold}$). The bandwidth partition between non-FFR bands and FFR bands is updated very slowly if the power setting change does not work. In one embodiment, the partition is updated every few hours, however, in alternative embodiments, other update rates can be used. In various embodiments, the network applies power control to adjust the relative power setting at first before using bandwidth partition.

Modified RNTP signaling is described in accordance with an embodiment of the invention. A normal RNTP comprises a bitmap, where a "1" represents high power band, and a "0" represents low power band. A power threshold is selected from a list, For example, in one embodiment, the list may comprise {-inf, -11, -10, -9, -8, -7, -6, -5, -4, -3, -2, -1, 0, +1, +2, +3}. In alternative embodiments, a different list can be used. The RNTP also includes a number of transmitting (Tx) antenna(s), a reference signal power boosting parameter, and OFDM symbols occupied by physical downlink control channel (PDCCH).

An X2 signaling message enables the DL ICIC adaptation. In various embodiments, the X2 signaling may be performed using either a modified RNTP signaling or by using a new X2 message as an overload indicator.

The modified RNTP message option is first described in accordance with embodiments of the invention. In embodiment, the boundaries between non-FFR, FFR (low power) and FFR (high power) bands are fixed or semi-statically changed, therefore, only bitmap in FFR band is used. In further embodiments, bit maps are used in other types of bands.

In a normal bitmap, "0" is used for low power RBs and "1" is used for high power RBs. In a modified bitmap, if the cell has cell coverage issues, it will set additional "1"s in low power RBs. Bandwidth assigned to a FFR (high power) band, however, is not changed. To reflect the level of the cell edge coverage problem, different numbers of "1" are added onto the original low power band in RNTP bitmap. $RNTP_{threshold}$ is used to indicate the power setting in FFR (low power) RBs allowing the individual cell to adjust the power setting for FFR (low power) RBs.

In an embodiment DL ICIC adaptation procedure, each cell starts with non-FFR plus hard FFR (hard frequency reuse-3) according to a predefined initial configuration. Each cell can increase the power setting for FFR (low power) one step higher if necessary. Hence, there is no need for a non-fully loaded system in some embodiments. Each cell can further increase the power setting for FFR (low power) if there is no complaint from its neighbors and there is a need to enhance the cell throughput. Each cell informs the neighboring cells of change of the power setting, and the neighboring cells update the interference adjustment accordingly.

If the cell edge throughput cannot be met by a cell for a certain period, the cell will request neighboring cells to reduce the transmit power in FFR (low power) RBs via the modified bitmap message in RNTP signaling or other X2 signaling. The cells that receive a request from neighboring cells reduce the power setting for FFR (low power) bands. The power back off steps can be determined based on the level of the coverage issue. For example, the number of the additional "1" in the bitmap may be used in reducing the power setting for the FFR (low power). If a cell no longer has a coverage issue, it releases the additional "1" in RNTP bitmap and sends new RNTP to neighboring cells.

If the coverage issue cannot be solved by the above procedure, the network reconfigures the bandwidth partition between non-FFR and FFR. All cells return to the initial state with a new initial state configuration, and the cells are informed by the network via eNB configuration message.

In an alternative DL ICIC adaptation procedure embodiment, each cell starts with non-FFR plus soft FFR with the power setting of the minimal allowed power difference between FFR (high power) and FFR (low power) according to a predefined bandwidth partition configuration. A cell releases some channel resources in a FFR (low power) band by not transmitting over some resource blocks in this region if the cell is not fully loaded. A cell may inform the neighboring cells of this change by replacing the corresponding "0" with "1" in the bitmap. The neighboring cells update the interference adjustment accordingly. If loading in the cell further reduced, more channel resource in the FFR (low power) band will be released.

If cell loading is further reduced and all the RBs in a FFR (low band) are released, channel resources in the FFR (high power) band are released. The cell informs neighboring cells of the change by replacing the corresponding "1" with "0" in the bitmap. The neighboring cells update the interference adjustment accordingly.

Figure 3:
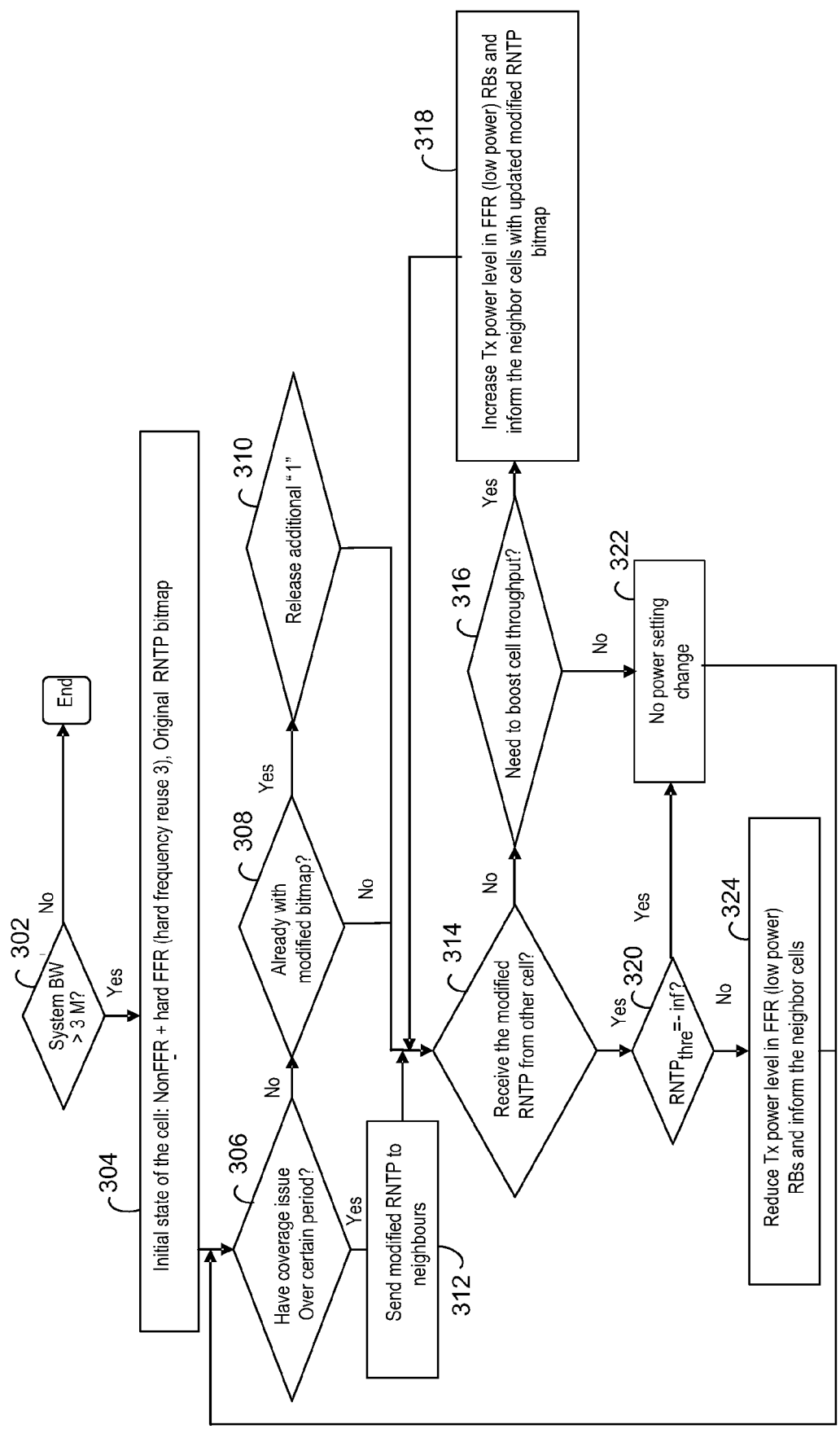
FIG. 3 illustrates an embodiment DL ICIC adaptation method.

FIG. 3 illustrates a further embodiment DL ISIS adaptation method. In step 302, the system bandwidth is compared to a threshold, for example, 3 MHz. In alternative embodiments, other thresholds can be used. If the system bandwidth is greater than the threshold, the cell is initialized with an initial FFR configuration, for example, a non-FFR band and a hard FFR band with a frequency reuse of 3, and with an original RNTP bitmap in step 304. If there has been a coverage issue within a certain period of time (step 306), a modified RNTP is sent to neighboring cells (step 312). Otherwise, if there has been no coverage issue within a certain period of time, and if the cell already has a modified bit map, an additional "1" is released (steps 308 and 310). Next, the cell checks to see if a modified RNTP is sent from another cell in step 314. If so, $RNTP_{thre}$ is checked to see if it is set to negative infinity in step 320. In alternative embodiments, other values besides negative infinity can be used. If $RNTP_{thre}=-inf$, then there is no power setting change (step 322) because there is no further room for power reduction in such scenario, otherwise the transmit power in FFR (low power) RBs is reduced and neighboring cells are informed of the power change in step 324. If the modified RNTP is not sent from another cell, the method checks to see if the cell needs to boost its throughput (step 316). If so, transmit power is increased in FFR (low power) RBs and neighboring cells are informed with an updated modified RNTP bitmap (step 318).

In an embodiment, power control can be performed by using a cell specific maximum power setting, or alternatively by using a UE specific power control. In one embodiment, a cell specific maximum power setting for non-FFR is the same energy per resource element (EPRE) as a frequency reuse-1 case. The total transmit power is determined according to the deployment and application scenario. The FFR (low power) band is set according to $RNTP_{threshold}$ and the FFR (high power) band is set to a default value that may be the same as a non-FFR. The power is boosted by stealing the power from lower power RBs. The power may further be determined by the cell size.

In an alternative embodiment using a UE specific power control, an additional slow OL power control is applied to avoid the unnecessary power transmission. The RS power boosting parameter may be used. In some embodiments, the power control is used to reduce inter-cell interference, and/or to improve the cell edge UE throughput (e.g., using a power boost). This is optional in PDSCH transmissions. In some embodiments, rate control is considered at first if a better performance can be obtained.

Figure 4A:
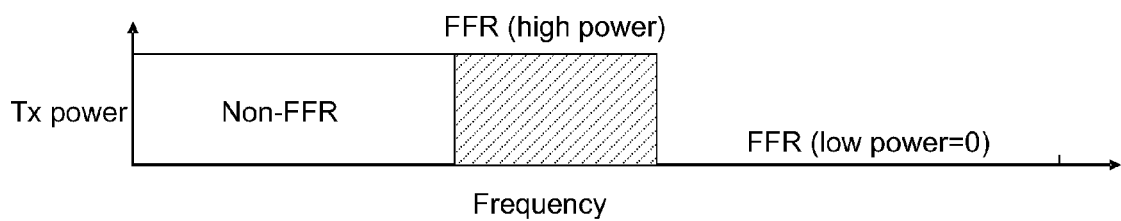
FIGS. 4a-b illustrate other embodiment band allocations.
Figure 4B:
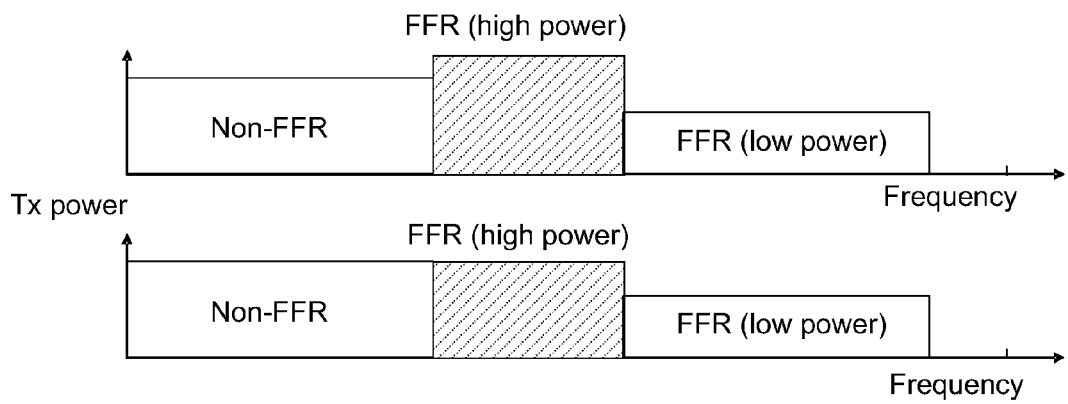

In an embodiment, a soft switch between different ICIC operation modes is realized through the semi-static change of power settings in different bands. In hard FFR, no transmission in FFR (low power) band is allowed in some embodiments. In static soft FFR, a non-zero transmit power setting in FFR (low power) band is used. In dynamic FFR, the power setting of FFR band is slowly changed. In non-FFR, the same power setting of non-FFR and FFR (high power) is used while maximizing the power setting in FFR (low power). FIG. 4 illustrates an embodiment using frequency reuse-1 and hard frequency reuse-3, and FIG. 4b illustrates an embodiment using frequency reuse-1 and soft frequency reuse-3. FIG. 4a shows examples of ICIC power settings with hard FFR. By increasing the transmit power in a FFR (low power) band, this ICIC mode can transit to an ICIC mode with soft FFR, where the transmit power in FFR low power band is not equal to zero, and to a non-FFR mode, where a single transmit power level is applied. FIG. 4b shows two examples of an ICIC power setting for soft FFR. By changing the transmit power in FFR (low power) band and/or FFR (high power band), this mode can transition to ICIC mode with hard FFR and non-FFR modes.

In an embodiment, in a non-FFR case, link adaptation is based on channel quality index (CQI) measurement. The CQI measurement is performed based on a common reference signal (CRS), which may not be able to reflect the difference for both the transmit power and interference level in different RBs. However, for ICIC, the transmit power in the serving cell and the interference from the neighbor cells become more colored. Therefore, the modulation and coding scheme (MCS) selection procedure in the FFR band is considered separately and a different power setting is utilized for some embodiments in order to have a better link adaptation performance.

In an embodiment, the MCS index for FFR (low power) RBs is adjusted by the offset determined from various factors. These factors include serving cell power setting relative to the non-FFR band and neighboring cell power setting information from X2 signaling. Neighboring cells are selected according to the strongest interference cells. In one embodiment, neighboring cells are selected based on the geometry of the cell layout. Furthermore, an estimated MCS offset parameter can be found from simulation.

For FFR (high power) RBs, the MCS index is adjusted by an offset determined by the following factors in an embodiment. These factors include, for example, serving cell power setting relative to non-FFR band and neighbor cell power setting information from X2 signaling. Neighboring cells are selected according to RSRP reports and may be different for each CEU.

Figure 5:
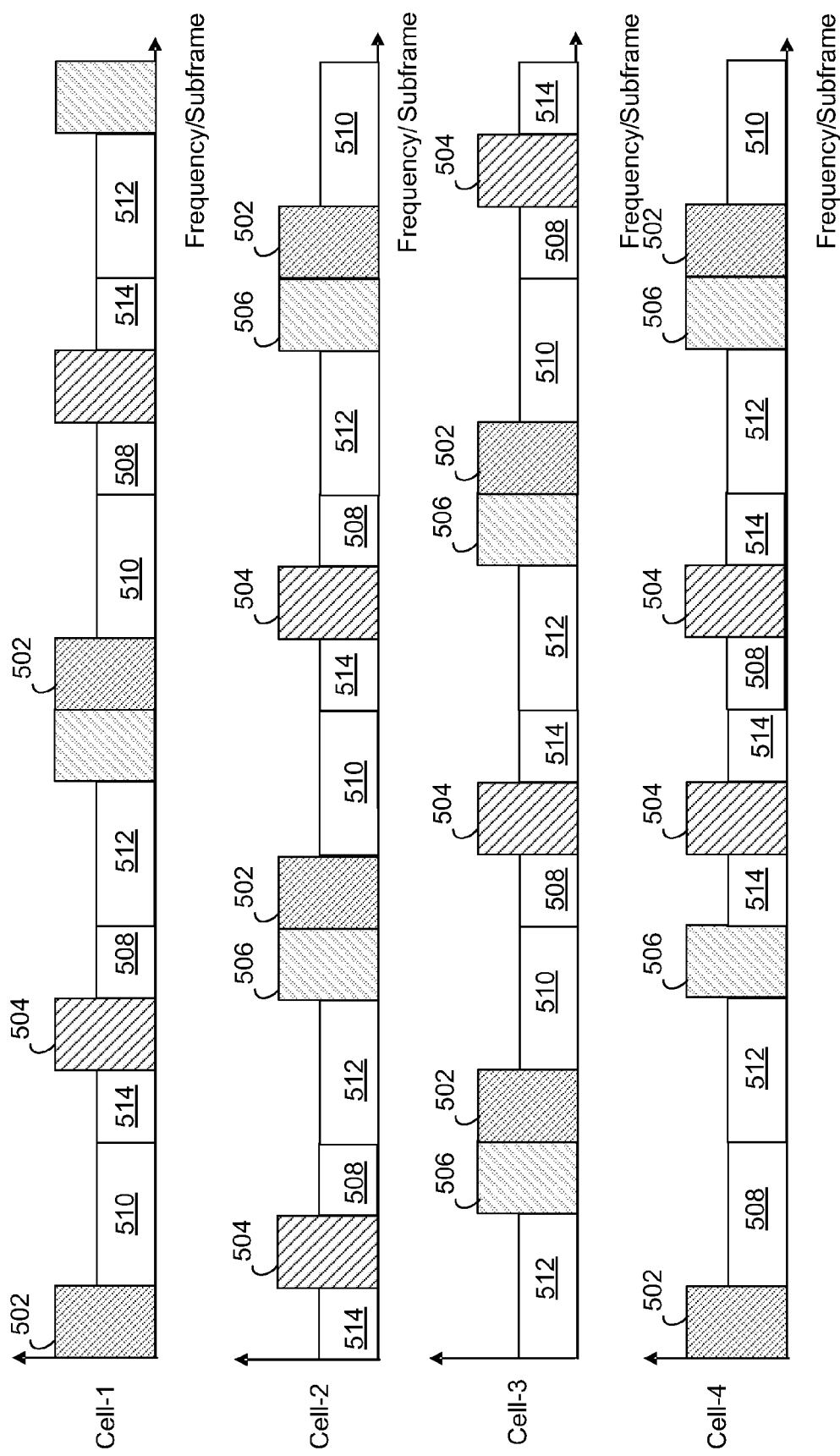
FIG. 5 illustrates an embodiment band allocation over four cells.

FIG. 5 illustrates cell band diagrams according to an alternative method. Subbands of FFR types 502, 504, 506, 508, 510, 512 and 514 are assigned to Cell-1, Cell-2, Cell-3 and Cell-4. The subband assignments depicted in FIG. 5 is an example. In further embodiments, other patterns using greater or few FFR types can be implemented. A cell specific FFR reuse pattern shift is applied to randomize the colored interference in FFR band. This reduces the overall interference variation and reduces the interference collision. One option includes a shift between RBGs. A different FFR pattern is applied to different RBGs according to a predefined sequence, and may be cell ID dependent. A same power setting is used in different RBGs. In case one FEC block crosses the RBGs with a different reuse pattern, the weighting factor obtained from the neighbor reuse pattern may be used to improve the decoding performance. In some embodiments, retransmission in RBGs is scheduled with different FFR patterns from the first transmission In a further embodiment, another option includes a shift between subframes. A different FFR pattern is applied to different subframes according to a predefined sequence, which may be cell ID dependent. The transmission is scheduled to the subframe with a different FFR pattern in one embodiment.

The embodiments described above with respect to adjusting MCS and shifting the FFR pattern are combined in various embodiments. In some embodiments, out-loop MCS adjustment based on block error rate control can be applied as well.

In an embodiment, the load in different cells is different in unbalanced networks. Some cells may be fully loaded while the others may not. In embodiments, cell edge UE performance can be further enhanced if neighboring cells are not fully loaded. To achieve this enhancement, in one case, the cell edge UE in the non-fully loaded cell is scheduled to as non-FFR as far as possible. The power level in FFR (low power) is set at zero by setting $RNTP_{threshold}=-inf$.

The high power PRB is released and neighboring cells may be informed when there are unused channel resources in the partially loaded cell. In an embodiment, this is performed by replacing "1" with "0" in the released PRBs in the bitmap in FFR (high power) band. In an embodiment, the power level of the non-released PRB in FFR (high power) band is set to be the same as a non-FFR zone. Cross-boundary scheduling between non-FFR and FFR (high power) for all modulation levels is allowed.

For lightly loaded systems, UEs are scheduled in a non-FFR zone according to some embodiments. Hence, to totally release the FFR zone, $RNTP_{threshold}$ is set to negative infinity. In an embodiment, all zeros are replaced by ones in the non-FFR bitmap.

As described above, embodiments of the invention include hybrid rate control and power control, which are applied in a non-FFR zone and FFR zone separately, as well as a bandwidth partition between non-FFR zone and FFR zone. Various embodiments include UE classification to select the cell edge user and cell center user and scheduling priority in different bands to schedule different category UEs in different bands. Further embodiments use a DL ICIC adaptation mechanism, modified RNTP signaling and procedure, and power control to enable the soft switch between different ICIC modes. Link adaptation for DL ICIC is used to compensate the colored inter-cell interference in accordance with embodiments of the invention. Embodiments also include DL ICIC for unbalanced networks to further improve the performance of heavily loaded cells.

Figure 6:
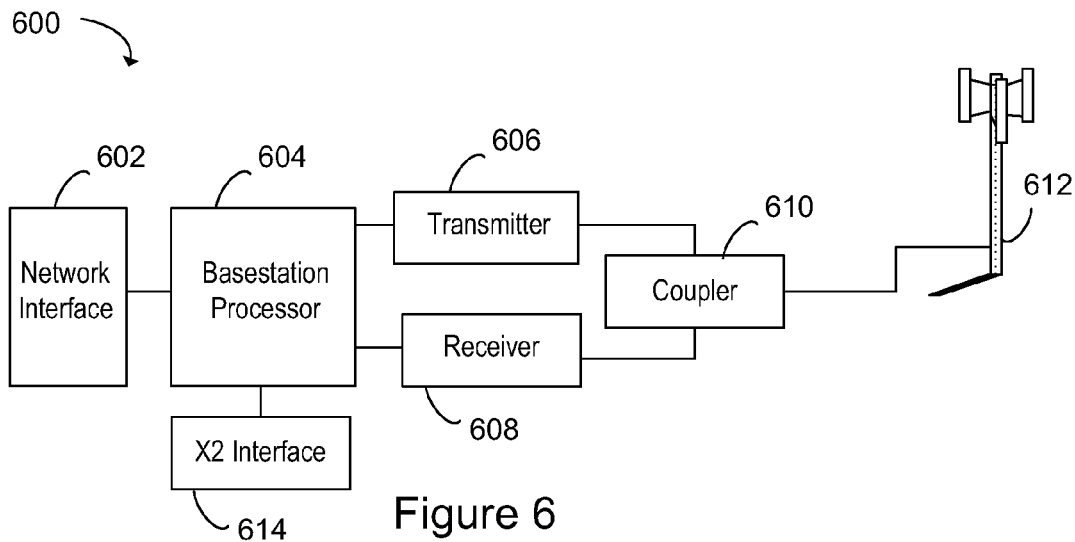
FIG. 6 illustrates a block diagram of an embodiment base station.

A block diagram of an embodiment base station 600 is illustrated in FIG. 6. Base station 600 has base station processor 604 coupled to transmitter 606 and receiver 608, and network interface 602. Transmitter 606 and receiver 608 are coupled to antenna 612 via coupler 610. Base station processor 604 executes embodiment methods and algorithms. In an embodiment, base station 600 is configured to operate in a LTE network using an OFDMA downlink channel divided into multiple subbands and using single carrier FDMA in the uplink. In alternative embodiments, other systems, network types and transmission schemes can be used, for example, 1XEV-DO, IEEE 802.11, IEEE 802.15 and IEEE 802.16. In alternative embodiments, base station 600 can have multiple transmitters, receivers and antennas (not shown) to support MIMO operation. In an embodiment, base station processor 604 is also coupled to X2 interface 614. In alternative embodiments, interface 614 can be another type of communication interface for communicating with another base station.

Figure 7:
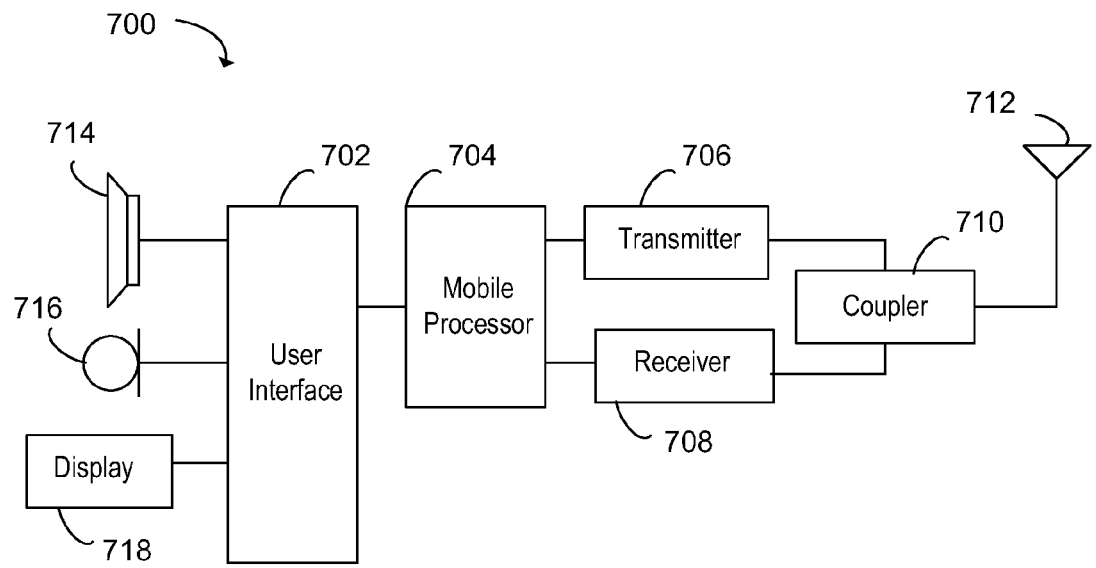
FIG. 7 illustrates a block diagram of an embodiment user device.

A block diagram of embodiment user device 700 is illustrated in FIG. 7. User device 700 can be, for example, a cellular telephone or other mobile communication device, such as a computer or network enabled peripheral. Alternatively, user device 700 can be a non-mobile device, such as a desktop computer with wireless network connectivity. User device 700 has mobile processor 704, transmitter 706 and receiver 708, which are coupled to antenna 712 via coupler 710. User interface 702 is coupled to mobile processor 704 and provides interfaces to loudspeaker 714, microphone 716 and display 718, for example. Alternatively, user device 700 may have a different configuration with respect to user interface 702, or user interface 702 may be omitted entirely. In embodiment, user device is configured to operate according to embodiment algorithms. In alternative embodiments, user device 700 can have multiple transmitters, receivers and antennas (not shown) to support MIMO operation.

In an embodiment, a method of operating a base station in a wireless system includes partitioning a frequency band into at least one band of a first type and at least one band of a second type. The at least one band of the first type includes a band on which the base station transmits power proportional to a distance of a user device from the base station, and the at least one band of the second type includes a band on which the base station transmits a data rate inversely proportional to a distance of a user device from the base station. The method further includes coordinating the partitioning with at least one further base station. In an embodiment, the method further includes updating the partitioning of the frequency band. In an embodiment, updating the partitioning includes updating a partition between bands of the first type and bands of the second type. In an embodiment, the base station is an eNB operating on a long-term evolution (LTE) network.

In an embodiment, the at least one band of the first type includes a fractional frequency reuse (FFR) band, and the at least one band of the second type includes a non-fractional frequency reuse (non-FFR) band. In an embodiment, the method further includes the base station scheduling a cell edge user device on at least one FFR band and the base station scheduling a cell center user on at least one FFR band and at least one non-FFR band.

In a further embodiment, coordinating includes receiving power change information from the at least one further base station and transmitting power change information to the at least one further base station. In an embodiment, receiving power change information and transmitting power change information includes signaling the at least one further base station using X2 signaling.

In an embodiment partitioning includes partitioning the frequency band according to an initial configuration, changing a power setting of the at least one band of the first type, transmitting the changed power setting to at least one user device, informing the at least one further base station of the changed power setting, and changing a bandwidth partition between the at least one band of the first type and the at least one band of the second type after changing the power setting.

In an embodiment, a method of operating a base station configured to communicate with user devices includes receiving signal information from the user devices, classifying the users devices as cell edge users (CEUs) or cell center users (CCUs) based on the signal information, scheduling the CEUs to high power resource blocks of fractional frequency reuse (FFR) bands within a frequency band, and scheduling the CCUs to low power resource blocks of fractional frequency reuse (FFR) band within a frequency band and in non-fractional frequency reuse (non-FFR) bands of the frequency band. In an embodiment, the signal information includes information about signals received by the user devices. In an embodiment, the signal information includes reference signal received power reports (RSRPs). In an embodiment, the base station is an eNB operating on a long-term evolution (LTE) network.

In an embodiment, the method further includes scheduling CEUs reporting more neighbor cells with higher priority then CEUs reporting less neighboring cells when all of the CEUs cannot be scheduled in the high power resource blocks of the FFR bands. In an embodiment, the method further includes scheduling remaining CEUs in non-FFR bands of the frequency band. In one embodiment, scheduling the CCUs further includes scheduling CCUs in low power resource blocks of the FFR bands. In a further embodiment, the method also includes scheduling remaining CCUs in the high power resource blocks of the FFR bands if a channel resource of the non-FFR bands and low power resource blocks of the FFR bands are not enough to fit all of the CCUs.

In an embodiment, method of communicating in a wireless system includes configuring a cell in a network with an initial configuration of fractional frequency reuse (FFR) bands and non-fractional frequency reuse (non-FFR) bands, changing the power setting of the FFR bands in the cell to a changed power setting, informing a user device of the changed power setting, informing neighboring cells of the changed power setting, and changing a bandwidth partition between non-FFR bands and FFR bands after changing the power setting of the FFR bands. The initial configuration assigns a power setting to a low power setting and a high power setting of the FFR bands. In a further embodiment, informing the user device includes signaling power change information though radio resource control (RRC) signaling.

In one embodiment, informing neighboring cells includes using X2 signaling. In a further embodiment, X2 signaling comprises a modified relative narrowband transmit power signaling. In a further embodiment, X2 signaling includes introducing a new X2 message as an overload indicator.

In an embodiment, changing the bandwidth partition is performed through a network re-configuration message. In an embodiment, the cell includes a base station. In a further embodiment, the initial configuration is based on a network-wide initial configuration.

In an embodiment, a base station includes a transmitter, a communications interface configured to interface with at least one further base station, and a processor partitioning a frequency band into at least one band of a first type and at least one band of a second type. In an embodiment, the at least one band of the first type includes a band on which the base station transmits on the transmitter a power proportional to a distance of a user device from the base station. In an embodiment, the at least one band of the second type has a band on which the base station transmits on the transmitter a data rate inversely proportional to a distance of a user device from the base station, and the base station coordinates the partitioning with the at least one further base station via the communications interface. In an embodiment, the communications interface comprises an X2 interface.

Advantages of embodiments include enhanced cell capacity and coverage and predictable cell edge performance. Further advantages include a slow adaptation with less X2 signaling overhead. Embodiments of the invention are advantageously lower in complexity relative to other means to achieve ICIC. In some embodiments that partition bandwidth between various forms of FFR subbands, Although the embodiments and their advantages have been described in detail, it should be understood that various changes, substitutions and alterations could be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of operating a base station in a wireless system, the method comprising:
   partitioning a frequency band into at least one band of a first type and at least one band of a second type, wherein
      the at least one band of the first type comprises a fractional frequency reuse (FFR) band on which the base station transmits power proportional to a distance of a user device from the base station,
      the at least one band of the second type comprises a non-fractional frequency reuse (non-FFR) band on which the base station transmits a data rate inversely proportional to a distance of a user device from the base station; and
   coordinating the partitioning with at least one further base station, the coordinating comprising adjusting a bandwidth partition between the FFR band and the non-FFR band of the base station to be similar to a bandwidth partition between a FFR band and a non-FFR band of at least one further base station.

2. The method of claim 1, further comprising updating the partitioning of the frequency band.

3. The method of claim 1, further comprising:
   the base station scheduling a cell edge user device on at least one FFR band; and
   the base station scheduling a cell center user on at least one non-FFR band.

4. The method of claim 1, wherein coordinating further comprises:
   receiving power change information from the at least one further base station; and
   transmitting power change information to the at least one further base station.

5. The method of claim 4, wherein receiving power change information and transmitting power change information comprises signaling the at least one further base station using X2 signaling.

6. The method of claim 1, wherein the base station comprises an eNB operating on a long-term evolution (LTE) network.

7. The method of claim 1, wherein:
partitioning comprises
partitioning the frequency band according to an initial configuration, and
changing a power setting of the at least one band of the first type; and
coordinating further comprises
transmitting the changed power setting to at least one user device,
informing the at least one further base station of the changed power setting, and
changing the bandwidth partition between the FFR band and the non-FFR band after changing the power setting.

8. A method of operating a base station configured to communicate with user devices, the method comprising:
receiving signal information from the user devices, the signal information comprising information about signals received by the user devices;
classifying the users devices as cell edge users (CEUs) or cell center users (CCUs) based on the signal information;
scheduling the CEUs to high power resource blocks of fractional frequency reuse (FFR) bands within a frequency band;
scheduling the CCUs in non-fractional frequency reuse (non-FFR) bands of the frequency band; and
semi-statically updating a partition between the FFR bands and the non-FFR bands;
scheduling CEUs reporting more neighbor cells with higher priority than CEUs reporting less neighboring cells when all of the CEUs cannot be scheduled in the high power resource blocks of the FFR bands; and
scheduling remaining CEUs in non-FFR bands of the frequency band.

9. The method of claim 8, wherein the signal information comprises reference signal received power reports (RSRPs).

10. The method of claim 8, wherein scheduling the CCUs further comprises scheduling CCUs in low power resource blocks of the FFR bands.

11. The method of claim 10, further comprising scheduling remaining CCUs in the high power resource blocks of the FFR bands if a channel resource of the non-FFR bands and low power resource blocks of the FFR bands are not enough to fit all of the CCUs.

12. The method of claim 8, wherein the base station comprises an eNB operating on a long-term evolution (LTE) network.

13. A method of communicating in a wireless system, the method comprising:
configuring a cell in a network with an initial configuration of fractional frequency reuse (FFR) bands and non-fractional frequency reuse (non-FFR) bands, wherein the initial configuration assigns a power setting to a low power setting and a high power setting of the FFR bands;
changing the power setting of the FFR bands in the cell to a changed power setting;
informing a user device of the changed power setting;
changing a bandwidth partition between non-FFR bands and FFR bands after changing the power setting of the FFR bands, the changing the bandwidth partition comprising adjusting the bandwidth partition between the FFR bands and the non-FFR bands at the cell to be similar to a bandwidth partition between FFR bands and non-FFR bands at least one neighboring cell; and
informing the at least one neighboring cell of the changed power setting.

14. The method of claim 13, wherein informing the user device comprising signaling power change information though radio resource control (RRC) signaling.

15. The method of claim 13, wherein informing the at least one neighboring cell comprises using X2 signaling.

16. The method of claim 15, wherein the X2 signaling comprises a modified relative narrowband transmit power signaling.

17. The method of claim 15, wherein the X2 signaling comprises introducing a new X2 message as an overload indicator.

18. The method of claim 15, wherein changing the bandwidth partition is performed through a network re-configuration message.

19. The method of claim 13, wherein the cell comprises a base station.

20. The method of claim 13, wherein the initial configuration is based on a network-wide initial configuration.

21. A base station comprising:
a transmitter;
a communications interface configured to interface with at least one further base station; and
a processor configured to partition a frequency band into at least one band of a first type and at least one band of a second type, wherein
the at least one band of the first type comprises a fractional frequency reuse (FFR) band on which the base station is configured to transmit on the transmitter using a power proportional to a distance of a user device from the base station,
the at least one band of the second type comprises a non-fractional frequency reuse (non-FFR) band on which the base station is configured to transmit on the transmitter using a data rate inversely proportional to a distance of a user device from the base station,
the base station is configured to coordinate the partitioning with the at least one further base station via the communications interface; and
the base station is configured to adjust a bandwidth partition between the FFR band and the non-FFR band to be similar to a bandwidth partition between a FFR band and a non-FFR band of the at least one further base station.

22. The base station of claim 21, wherein the communications interface comprises an X2 interface.

23. A method of operating a base station configured to communicate with user devices, the method comprising:
receiving signal information from the user devices, the signal information comprising information about signals received by the user devices;
classifying the users devices as cell edge users (CEUs) or cell center users (CCUs) based on the signal information;
scheduling the CEUs to high power resource blocks of fractional frequency reuse (FFR) bands within a frequency band;
scheduling the CCUs in non-fractional frequency reuse (non-FFR) bands of the frequency band
scheduling CEUs reporting more neighbor cells with higher priority than CEUs reporting less neighboring cells when all of the CEUs cannot be scheduled in the high power resource blocks of the FFR bands; and scheduling remaining CEUs in non-FFR bands of the frequency band.

24. A method of operating a base station configured to communicate with user devices, the method comprising:
receiving signal information from the user devices, the signal information comprising information about signals received by the user devices;
classifying the users devices as cell edge users (CEUs) or cell center users (CCUs) based on the signal information;
scheduling the CEUs to high power resource blocks of fractional frequency reuse (FFR) bands within a frequency band; and
scheduling the CCUs in non-fractional frequency reuse (non-FFR) bands of the frequency band, wherein scheduling the CCUs further comprises
scheduling CCUs in low power resource blocks of the FFR bands, and
scheduling remaining CCUs in the high power resource blocks of the FFR bands if a channel resource of the non-FFR bands and low power resource blocks of the FFR bands are not enough to fit all of the CCUs.

* * * * *